(12) United States Patent
Kozel et al.

(10) Patent No.: US 11,511,428 B2
(45) Date of Patent: Nov. 29, 2022

(54) SWITCHGEAR OR CONTROLGEAR WITH UNMANNED OPERATION AND MAINTENANCE, AND METHOD OF OPERATING THE SAME

(71) Applicant: ABB Schweiz AG, Baden (CH)

(72) Inventors: Tomas Kozel, Brno (CZ); Thomas Schmidtchen, Houston, TX (US); Martin Stefanka, Rajhrad (CZ)

(73) Assignee: ABB Schweiz AG, Baden (CH)

( * ) Notice: Subject to any disclaimer, the term of this patent is extended or adjusted under 35 U.S.C. 154(b) by 331 days.

(21) Appl. No.: 16/727,979

(22) Filed: Dec. 27, 2019

(65) Prior Publication Data

US 2020/0130186 A1   Apr. 30, 2020

Related U.S. Application Data

(63) Continuation of application No. PCT/EP2018/066990, filed on Jun. 25, 2018.

(30) Foreign Application Priority Data

Jun. 28, 2017 (EP) .................................... 17178397
Dec. 21, 2017 (EP) .................................... 17209545

(51) Int. Cl.
*B25J 9/16* (2006.01)
*H02B 3/00* (2006.01)
(Continued)

(52) U.S. Cl.
CPC .......... *B25J 9/1671* (2013.01); *B25J 9/1679* (2013.01); *G05B 19/4061* (2013.01); *H02B 3/00* (2013.01);
(Continued)

(58) Field of Classification Search
CPC ...... B25J 9/1671; B25J 9/1605; B25J 9/1674; B25J 9/1679; G05B 17/02; G05B 13/04;
(Continued)

(56) References Cited

U.S. PATENT DOCUMENTS 10,414,046 B1 * 9/2019 Morey ........................ B25J 9/08
2013/0231779 A1   9/2013 Purkayastha et al.
(Continued)

FOREIGN PATENT DOCUMENTS

| CN | 105701964 A | 6/2016 | |
| EP | 3035134 A1 | 6/2016 | |
| WO | WO-2015081455 A1 * | 6/2015 | .......... B25J 15/0293 |

OTHER PUBLICATIONS

China National Intellectual Property Administration, Office Action in Chinese Patent Application No. 201880043468.5, 9 pp. (May 23, 2022).

*Primary Examiner* — Khoi H Tran
*Assistant Examiner* — Tanner L Cullen
(74) *Attorney, Agent, or Firm* — Leydig, Voit & Mayer, Ltd.

(57) ABSTRACT

A switchgear or controlgear with unmanned operation and maintenance includes: an equipment safety system that includes a steering and control system for calculating a action radius of a robot system. An acting area in an internal space of the switchgear or controlgear is divided into virtual zones. Each action in each virtual zone is precalculated predictively as a micro simulation in which actual sensor data are considered before an intended action is triggered.

7 Claims, 3 Drawing Sheets

(51) Int. Cl.
*G05B 19/4061* (2006.01)
*G05B 9/02* (2006.01)

(52) U.S. Cl.
CPC .............. *G05B 2219/49157* (2013.01); *G05B 2219/50391* (2013.01)

(58) Field of Classification Search
CPC ........... G05B 2219/49157; G05B 2219/50391; H02B 3/00
See application file for complete search history.

(56) References Cited

U.S. PATENT DOCUMENTS

| | | | |
|---|---|---|---|
| 2014/0088949 A1* | 3/2014 | Moriya | B25J 9/1612 703/22 |
| 2016/0190790 A1* | 6/2016 | Oudalov | H02H 3/08 361/66 |
| 2017/0021502 A1* | 1/2017 | Nusser | B25J 9/1697 |
| 2017/0106537 A1* | 4/2017 | Chizeck | B25J 9/1689 |
| 2018/0215034 A1* | 8/2018 | Jean | G05B 19/4182 |

* cited by examiner

SWITCHGEAR OR CONTROLGEAR WITH UNMANNED OPERATION AND MAINTENANCE, AND METHOD OF OPERATING THE SAME

CROSS-REFERENCE TO PRIOR APPLICATION

This application is a continuation of International Patent Application No. PCT/EP2018/066990, filed on Jun. 25, 2018, which claims priority to European Patent Application No. EP 17 209 545.7, filed on Dec. 21, 2017 and to European Patent Application No. EP 17 178 397.0, filed on Jun. 28, 2017. The entire disclosure of the foregoing applications is hereby incorporated by reference herein.

FIELD

The invention relates to a switchgear or controlgear with unmanned operation and maintenance, and method of operating the same.

BACKGROUND

Switchgears or controlgear with unmanned operation and maintenance ensures the same personnel safety levels as current generation of switchgear or controlgear by excluding human operators from the operation and maintenance processes and by the outer enclosure 23. However, due to open internal space without segregations 22 and embedded robotic system 21 new requirements to equipment safety assurance must be defined. Current common practice of protection provided by enclosure would not be beneficial inside switchgear or controlgear with unmanned operation and maintenance, therefore other means to ensure equipment safety are required.

SUMMARY

In an embodiment, the present invention provides a switchgear or controlgear with unmanned operation and maintenance, comprising: an equipment safety system, comprising a steering and control system configured to calculate a action radius of a robot system, wherein an acting area in an internal space of the switchgear or controlgear is divided into virtual zones, and wherein each action in each virtual zone is precalculated predictively as a micro simulation in which actual sensor data are considered before an intended action is triggered.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention enhances safety in operation of unmanned switchgear operation.

The internal segregation in current design of switchgear or controlgear serve primarily personnel safety purpose and secondarily equipment safety purpose by preventing foreign solid objects entering potentially hazardous areas with live primary circuits. The degrees of protection provided by enclosure (Code IP) are described in IEC 60529 standard.

So considering what was said in the object of the invention, the equipment safety system of switchgear and controlgear with unmanned operation and maintenance consists in its action radius of a division of the acting area in the internal switchgear or controlgear space into virtual zones, and each action in such a zone is calculated predictively as a kind of a micro simulation, in which actual sensor data are considered, before the intended action will be really triggered.

Figure 1:
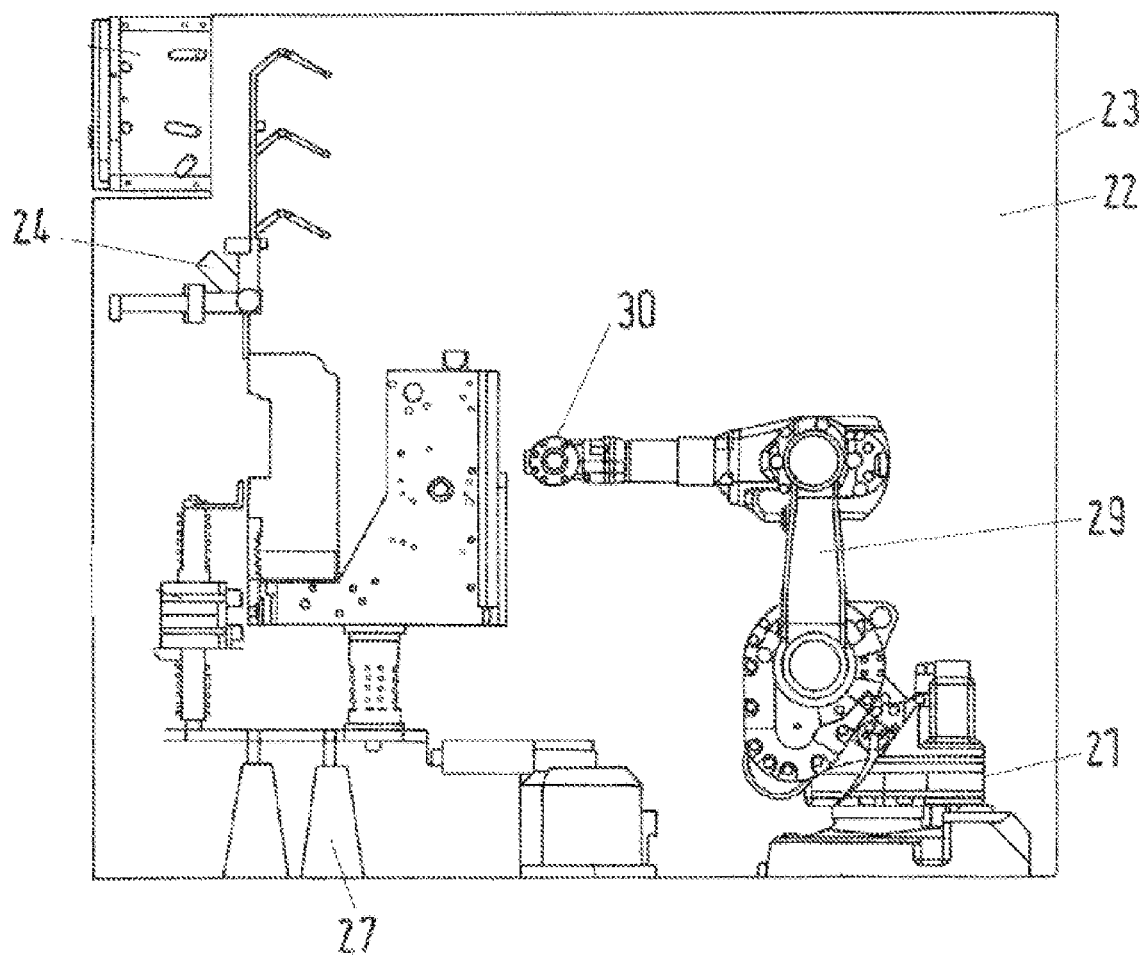
FIG. 1: Example crossection of switchgear or controlgear with unmanned operation and maintenance
Figure 2:
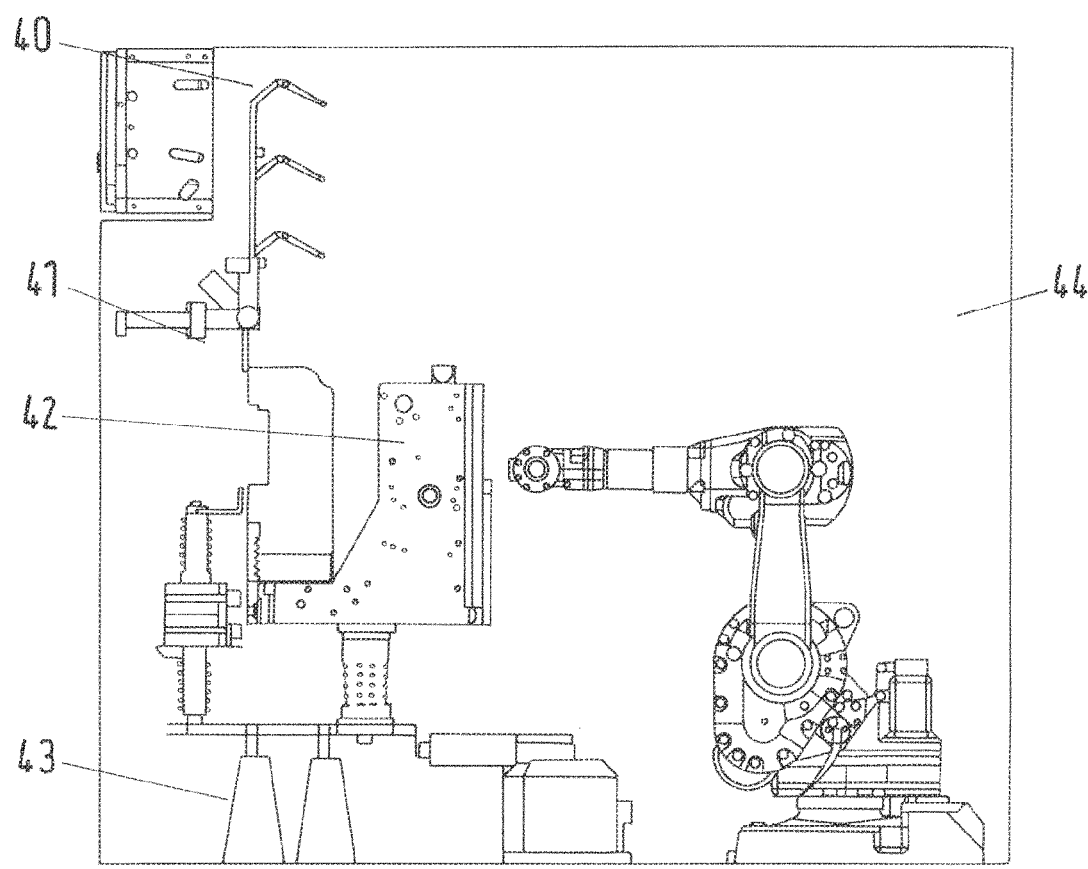
FIG. 2: Example of dividing the internal space to virtual zones

That is shown in FIG. 2.

So by the invention great risks in operating a switch- or controlgear are overcome.

In unmanned switchgear or controlgear system energized primary circuits are in the same space with moving robotic system. The robotic system represents foreign solid object moving near the energized circuits and the robotic system has to ensure it does not cause equipment faults.

According to a method of operating such a switch- or controlgear, the invention is, that an equipment safety system of switchgear and controlgear with unmanned operation and maintenance consists in its steering and control system of means for calculating the action radius of a robot system, wherein the acting area in the internal switchgear or controlgear space is divided into virtual zones, and each action in such a zone is precalculated predictively as a kind of a micro simulation, in which actual sensor data are considered, before the intended action will be really triggered.

In a further advantageous embodiment, the complete action area is divided and structured automatically under consideration of the following conditions:

detection of a main busbars zone, which contain all horizontal busbars and T-offs circuits of one busbar section up to all points of disconnection, and/or detection of each switch-disconnector, which each have its own zone including the moving contact of the switch-disconnector when in earthed position and all the circuits up to the next point of opening like circuit breaker main contacts, and/or each primary circuit continuing from the circuit breaker main contacts, which each have its own zone covering the circuits up to the next point of disconnection or to the point where the circuits go out of the enclosure, and/or the zones containing auxiliary circuits and mechanisms, limited by metallic earthed segregation of the auxiliary circuit space from the primary circuit space.

The virtual zones are main busbar zone 40, disconnector switch zone 41, circuit breaker auxiliary zone 42, feeder primary circuits zone 43 and default secured zone 44. One common default secured zone 44 and one common main busbar zone 40 can exist across the whole section of feeders with no limits in z-axis, like shown in FIG. 3, while the disconnector switches zones 41*a*, 41*b*, 41*c*, . . . , circuit breakers auxiliary zones 42*a*, 42*b*, 42*c*, . . . and feeders primary circuits zones 43*a*, 43*b*, 43*c*, . . . are limited by virtual boundaries in z-axis and are separated for each particular feeder, see FIG. 3.

In general, the zones boundaries shall be defined in such way, that the robotic system cannot get to shorter than safe distance from energized circuits of a zone that is not secured when operating within zones that are secured. The safe distance depends on the primary circuits nominal voltage (Un), voltage withstand level (Ud) and basic insulation level (Up) and distances from current safe clearance and creepage distance practice shall be applicable here.

Figure 3:
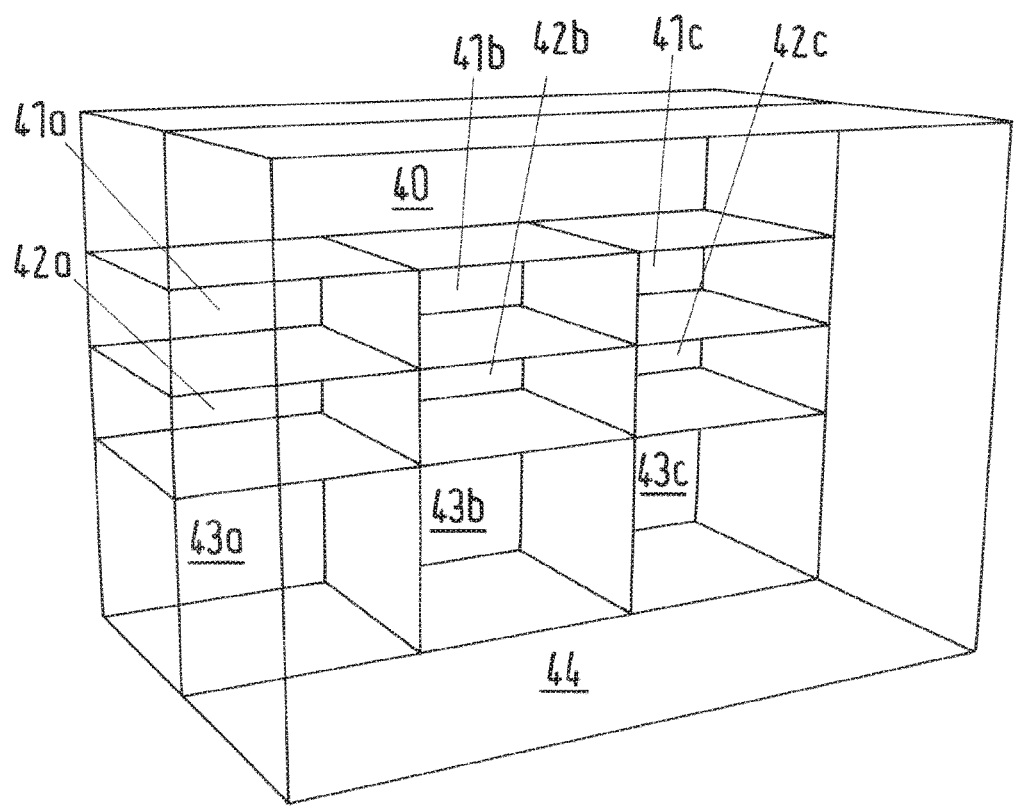
FIG. 3: 3D view of switchgear or controlgear segregation to virtual zones

Other zones layouts than shown on the examples FIG. 2 and FIG. 3 are possible, the zones should always respect physical layout of the primary circuits and the switching devices location in the circuits. The zone creation rules in general shall be following:

The main busbars zone shall contain all horizontal busbars and T-offs circuits of one busbar section up to all points of disconnection.

Each switch-disconnector 24 shall have its own zone including the moving contact of the switch-disconnector 24 when in earthed position and all the circuits up to the next point of opening (for example circuit breaker main contacts).

Each primary circuit continuing from the circuit breaker main contacts shall have its own zone covering the circuits up to the next point of disconnection or to the point 27 where the circuits go out of the enclosure 23.

The zones containing auxiliary circuits and mechanisms should be limited by metallic earthed segregation of the auxiliary circuit space from the primary circuit space.

Each virtual zone containing primary circuits 40, 41 and 43 can have one of following statuses:
1. zone energized: when primary circuits of corresponding zone are energized.
2. zone de-energized: primary circuits of corresponding zone are de-energized but not earthed.
3. zone secured: primary circuits of corresponding zone are de-energized and earthed.
4. zone locked in secured: zone is secured and any status change is locked as the robot 21 is operating in the zone.

Robotic system 21 movement limitations in zones containing primary circuits then depend on virtual zone status:
1. zone secured: robotic arm and tooling can physically interact with circuits inside the zone, before robot access secured zone, the zone status is switched to Locked in secured and when the interaction finishes the zone status is switched back to secured.
2. Zone de-energized: robotic arm and tooling must respect the clearance and creepage distance between de-energized circuits and robotic arm— only insulated tools can be used for interaction in de-energized zone.
3. zone energized: robot arm and tooling cannot enter the zone.

The status of the primary circuits (energized/de-energized/earthed) in each virtual zone can be learned from signals received from the limit switches associated with the switching devices (switch-disconnectors 24 and circuit breakers) or can be learned by visual confirmation of the device status using optical camera and automatic image recognition algorithms inside the switchgear or controlgear. The switching device status confirmation system can be made redundant by combining both above mentioned methods.

Confirmation of the primary circuits de-energized status can be obtained by real time voltage detection by electrical field measurement located on the robotic manipulator 29 wrist 30. A voltage proximity detector with directional discrimination is preferred due to complicated electrical field conditions in the switchgear or controlgear internal space 22.

Detection of rapid increase of electrical field strength while approaching primary circuits or even simple detection of strong electrical field in proximity to the conductors should cause immediate stop of the robot movement in the direction towards the primary circuits followed by retraction and reevaluation of the circuits status.

In alternative design to the one described in previous section, the voltage detection by electrical field measurement device or voltage detection contact tester is included into the robot tooling. The robot then starts an equipment interrogation with a voltage check routine using the voltage check device from his toolbox as the first step before interacting with the primary circuits in the virtual zone.

The virtual zones containing auxiliary circuits and mechanisms 42 can have following statuses:
1. zone energized or charged: when auxiliary circuits in corresponding zone are energized or the auxiliary mechanisms are charged.
2. zone secured: auxiliary circuits in corresponding zone are de-energized and auxiliary mechanisms are discharged.
3. Zone locked in secured: zone is secured and any status change is locked as the robot 21 is operating in the zone.

Robotic system 21 movement limitations in zones containing primary circuits then depend on virtual zone status:
1. zone secured: robotic arm and tooling can physically interact with circuits and mechanisms inside the zone, before robot access secured zone, the zone status is switched to locked in secured and when the interaction finishes the zone status is switched back to secured
2. zone energized or charged: robotic arm and tooling interaction is limited to replacement of pre-defined parts, that are built in such way, that no dangerous contact with energized circuits or charged mechanisms can happen While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switchgear or controlgear with unmanned operation and maintenance, the switchgear or controlgear comprising:
an equipment safety system, comprising a controller configured to calculate an action range of a robot system, by:
dividing an action area in an internal space of the switchgear or controlgear into a plurality of virtual zones based on physical layouts of a plurality of primary circuits of the switchgear or controlgear,
receiving status indicators for each circuit of the plurality of primary circuits from a set of limit switches,
determining a status for each zone in the plurality of virtual zones based on the received status indicators, and
precalculating an action range of a robot system interacting with the switchgear or controlgear in each of the plurality of virtual zones, wherein the action range limits movement of the robotic system in each zone of the plurality of virtual zones based on the determined status of the zone.

2. A method for operating a switchgear or controlgear with unmanned operation and maintenance, comprising:
dividing an action area in an internal space of the switchgear or controlgear into a plurality of virtual zones based on physical layouts of a plurality of primary circuits of the switchgear or controlgear;
receiving status indicators for each circuit of the plurality of primary circuits from a set of limit switches;
determining a status for each zone in the plurality of virtual zones based on the received status indicators; and
precalculating an action range of a robot system interacting with the switchgear or controlgear in each of the plurality of virtual zones, wherein the action range limits movement of the robotic system in each zone of the plurality of virtual zones based on the determined status of the zone.

3. The method according to claim 2, wherein the plurality of virtual zones in which the pluralirty of primary circuits are divided comprise:
a main busbars zone, which contains all horizontal busbars and T-offs circuits of one busbar section up to all points of disconnection;
a switch-disconnectors zone, wherein each switch-disconnector of the plurality of switch-disconnectors has a different zone;
a circuit breaker zone, wherein each circuit breaker of the plurality of circuit breakers has a different zone; and
auxiliary circuits and mechanisms zones, wherein the auxiliary circuits and mechanisms zones are limited by metallic earthed segregation of an auxiliary circuit space from a primary circuit space.

4. The method according to claim 2, wherein the physical layout of the plurality of circuits comprises:
each primary circuit continuing from circuit breaker main contacts covering circuits up to a next point of disconnection or to a point where the circuits go out of an enclosure.

5. The method according to claim 2, wherein the plurality of virtual zones include:
zone energized, wherein each of the plurality of primary circuits in zone energized are energized;
zone deenergized, wherein each of the plurality of primary circuits in zone de-energized are de-energized but not earthed; and
zone secured, wherein each of the plurality of primary circuits in zone secured are de-energized and earthed, and wherein a robotic arm of the robot system is able to physically interact with the plurality of primary circuits within zone secured.

6. The method of claim 5, wherein the robotic arm of the robot system present in zone de-energized must be a predetermined distance away from the de-energized circuits.

7. The method of claim 5, wherein the robotic arm of the robot system does not enter zone energized.

* * * * *